United States Patent
Krohn et al.

[11] Patent Number: 5,873,354
[45] Date of Patent: Feb. 23, 1999

[54] FUEL DELIVERY SYSTEM FOR AN INTERNAL COMBUSTION ENGINE

[75] Inventors: Klaus-Henning Krohn; Waldemar Hans, both of Bamberg; Joerg Lange, Eberdingen; Anwar Abidin, Leonberg; Thomas Betzel, Markgröningen; Uwe Grytz, Bamberg; Ulrich Vieweg, Nürnberg; Christof Vogel, Bischberg; Edwin Liebemann, Bamberg, all of Germany

[73] Assignee: Robert Bosch GmbH, Stuttgart, Germany

[21] Appl. No.: 793,185

[22] PCT Filed: Jun. 13, 1996

[86] PCT No.: PCT/DE96/01034

§ 371 Date: Jun. 6, 1997

§ 102(e) Date: Jun. 6, 1997

[87] PCT Pub. No.: WO97/00379

PCT Pub. Date: Jan. 3, 1997

[30] Foreign Application Priority Data

Jun. 17, 1995 [DE] Germany .................. 195 22 074.9

[51] Int. Cl.[6] ............ F02M 31/18; F02M 31/125; F02M 53/02; F02M 69/34
[52] U.S. Cl. ............................... 123/549; 123/585
[58] Field of Search .................. 123/549, 585, 123/179.21

[56] References Cited

U.S. PATENT DOCUMENTS

| 4,325,341 | 4/1982 | Yamauchi et al. | 123/549 |
|---|---|---|---|
| 4,378,001 | 3/1983 | Takeda et al. | 123/549 |
| 4,756,294 | 7/1988 | Nakayama et al. | 123/549 |
| 5,078,115 | 1/1992 | Yamashita et al. | 123/549 |
| 5,119,794 | 6/1992 | Kushida et al. | 123/549 |
| 5,154,154 | 10/1992 | Henke et al. | 123/549 |
| 5,172,673 | 12/1992 | Pelgrim et al. | 123/549 |
| 5,179,927 | 1/1993 | Henke et al. | 123/549 |
| 5,642,695 | 7/1997 | Spies et al. | 123/549 |

FOREIGN PATENT DOCUMENTS 41 19 206 12/1991 Germany .
2248087 3/1992 United Kingdom .

*Primary Examiner*—Marguerite McMahon
*Attorney, Agent, or Firm*—Kenyon & Kenyon

[57] ABSTRACT

A fuel delivery system for an internal combustion engine having an intake air metering device, leading to individual combustion chambers several fuel injection valves, each of which is assigned to one combustion chamber, and a central fuel vaporizer to which fuel can be supplied by a fuel metering device. To reduce pollutant emissions during the warm-up phase of the internal combustion engine after start-up, fuel vapor generated in the fuel vaporizer can be added to the intake air for the combustion chambers downstream from the intake air metering device.

17 Claims, 3 Drawing Sheets

FUEL DELIVERY SYSTEM FOR AN INTERNAL COMBUSTION ENGINE

FIELD OF THE INVENTION

The present invention relates to a fuel delivery system for an internal combustion engine.

BACKGROUND INFORMATION

A known fuel delivery system (British Patent 2,248,087 A) of has an air intake conduit with a throttle valve arranged in it, opening into an intake manifold from which intake tubes branch off to the individual combustion chambers of the internal combustion engine. Near the intake areas of the individual combustion chambers to inject fuel into the intake tubes to form a fuel-air mixture. An engine control unit controls the fuel injection as a function of the intake air volume through the air intake conduit, as well as other engine operating parameters.

Furthermore, the engine control unit acts on a central injection valve, with a respective fuel vaporizer installed upstream from the throttle valve on the air intake conduit, to supply vaporized fuel to the intake air.

During idling and partial-load operation of the internal combustion engine, the fuel-air mixture is formed by means of the central injection valve, whereas only the individual injection valves are used to supply fuel in high-load operation.

The problem with this approach is that a large portion of the fuel vapor generated during the warm-up phase after starting an internal combustion engine condenses upon intake into colder zones of the internal combustion engine and forms an unwanted wall film which leads to increased hydrocarbon emissions.

With another known fuel delivery system (German Patent Application No. 4,119,206 A1), an injection valve is provided near the intake area of each combustion chamber of an internal combustion engine to inject fuel into the respective intake tube or the intake area of the combustion chamber to form a fuel-air mixture. In addition, an air intake channel having a control valve is connected at the intake end of the air intake tube located upstream from a throttle valve. The air intake channel opens at the outlet end into the fuel outlet area of the respective injection valve.

In the warm-up phase of the internal combustion engine, air can be blown through the air intake channel into the fuel discharge area of the injection valve to support the atomization of fuel. The air supply through the air intake channel is regulated by the control valve as a function of the engine rpm, the intake vacuum, the engine temperature and/or other engine operating parameters.

With such a fuel delivery system, it is hardly possible to effectively prevent formation of a wall film of condensed fuel, which plays a significant role in hydrocarbon emissions during the warm-up phase after starting an internal combustion engine, i.e., when the engine is cold.

It is especially problematical that a greater amount of fuel must be supplied when the engine is cold than when it is hot to achieve an ignitable fuel-air mixture (with a certain proportion of vaporized fuel in the combustion chamber) because a large portion of the injected fuel condenses as a film on the various wall and thus does not contribute to the combustion, but instead is emitted as excess hydrocarbon in the exhaust. This causes an unwanted increase in hydrocarbon emissions during the warm-up phase of the internal combustion engine.

SUMMARY OF THE INVENTION

Compared to the related art, the fuel delivery system according to the present invention has the advantage that the fuel vapor generated by the fuel vaporizer can be delivered by the intake air into the combustion chambers so that its path to the respective combustion chamber is shortened, thereby largely presenting recondensation of the fuel and formation of a wall film. Proper preparation of the fuel supplied to the combustion chamber can be achieved and fuel emissions are greatly reduced during the warm-up phase when the internal combustion engine is cold during the first 80 seconds after starting the engine.

It is especially advantageous if the fuel vapor generated in the fuel vaporizer is fed into the intake area of the combustion chambers through a fuel vapor conduit system. Condensation of vaporized fuel can be further minimized using such a separate fuel vapor conduit system because the fuel vapor conduit system has a much smaller surface area and a smaller volume. Condensation of fuel vapor can be further reduced by using tubes or hoses made of a material with a low thermal conductivity, in particular plastic tubes or hoses.

The fuel vapor can be expelled advantageously from the fuel vaporizer due the change in volume in its transition to the vapor phase and delivered to the combustion chambers just in front of the intake valves. The same pressure gradient can be achieved as with the individual injection system, so the fuel can be metered with the same accuracy during the warm-up phase using the fuel vaporizer as with the individual injection valves in normal operation when the internal combustion engine is hot. The fuel delivery can be independent of the air metering (i.e., independent of the throttle valve and the auxiliary air regulator) so the uniform distribution of the fuel vapor to the combustion chambers can be optimized to further improve the exhaust values. In another advantageous embodiment of the invention, the fuel vaporizer is provided in an auxiliary air conduit so that some of the intake air can be supplied to it to support the transport of vaporized fuel, to purge the fuel vaporizer and the fuel vapor conduits with air and to improve the fuel delivery characteristics of the fuel vaporizer. An especially simple design of the fuel delivery system according to the present invention is achieved in this way.

BRIEF DESCRIPTION OF THE DRAWINGS

Exemplary embodiments of the present invention are illustrated in the figures, and are described in more detail hereafter.

Corresponding parts in the various figures are labeled with the same notation.

DETAILED DESCRIPTION

Figure 1:
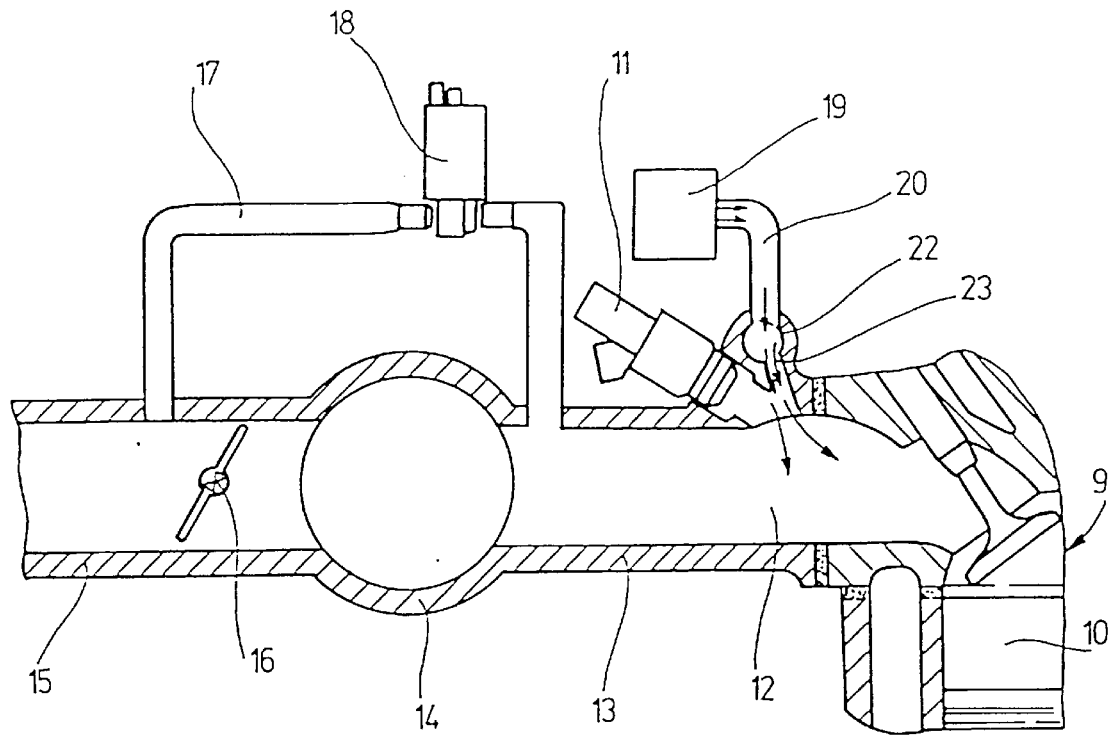
FIG. 1 shows a schematic diagram of a fuel delivery system according to a first embodiment of the present invention.

FIG. 1 shows a fuel delivery system for an internal combustion engine 9 whose combustion chambers 10 are each provided with an injection valve 11 such that fuel supplied to injection valve 11 is injected into intake area 12 of intake tube 13 leading to combustion chamber 10. At the input end, intake tubes 13 (only one of which is shown) are connected to intake manifold 14 which is in turn connected to air intake tube 15. A throttle valve 16 is provided in air intake tube 15 as the intake air metering device. An auxiliary air conduit 17 with auxiliary air regulator 18 is provided in the area of throttle valve 16.

A central fuel vaporizer 19 that is connected to a fuel delivery conduit in a manner not shown in detail here is connected via conduit 20 to a distributor conduit 22 that extends over injection valves 11 and opens into the corresponding intake tube 13 through outlet orifices 23 close to fuel outlet areas 24 of injection valves 11.

Figure 3:
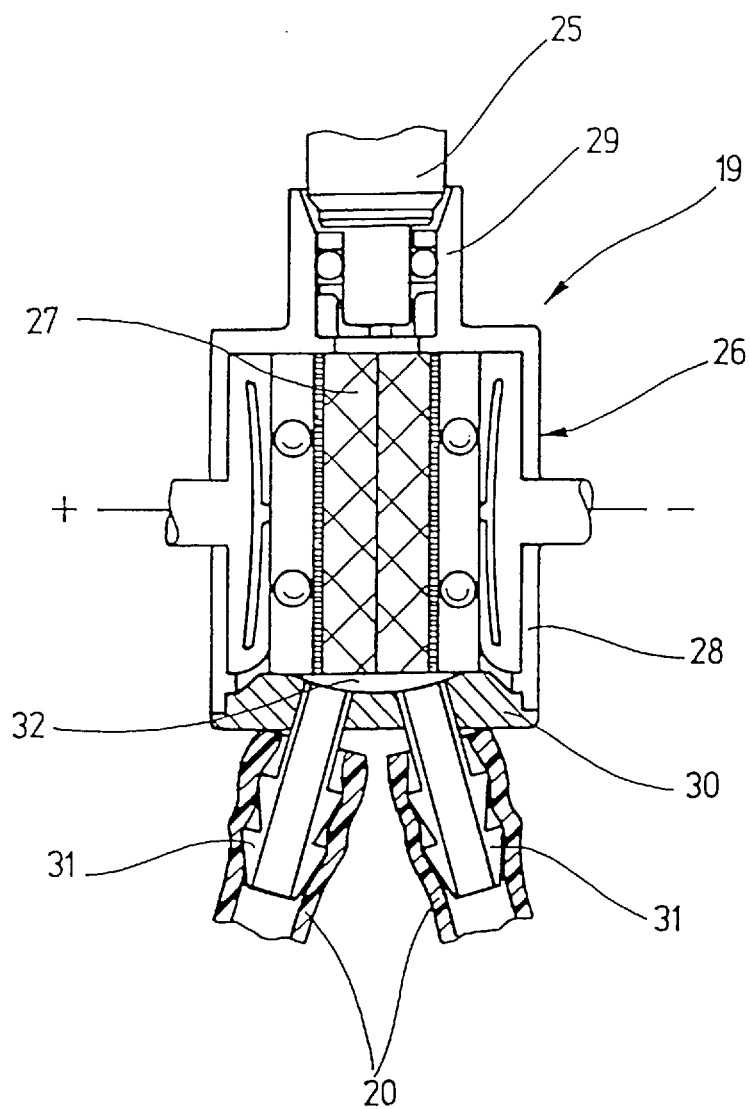
FIG. 3 shows a schematic diagram of a fuel vaporizer according to the present invention.

Central fuel vaporizer 19 consists, e.g. as shown in FIG. 3, of an injection valve 25 and a heating attachment 26 that has as the electrically heatable vaporizer structure 27 PTC or NTC elements with external control (i.e., resistance heating elements with a positive or negative temperature coefficient), arranged in a vaporizer housing 28. With PTC elements there is self-regulation that can also be used alone. The heating elements of vaporizer structure 27 may be in the form of plates or porous elements. Vaporizer housing 28 has a holding bushing 29 for injection valve 25 and a connecting cover 30 that has one or more connectors 31 for connection to a fuel vapor conduit system.

The fuel vapor conduit system includes, for example, as illustrated in FIG. 1, a conduit 20 leading to a distributor conduit 22. However, as illustrated in FIG. 3, two conduits 20 may also be provided, leading to a distributor conduit 22. In addition, it is also conceivable to provide for each combustion chamber 10 of the internal combustion engine a conduit 20 connecting an outlet area 32 of vaporizer housing 28 to the corresponding intake area 12 of a combustion chamber 10 in intake tube 13.

The fuel vapor conduit system is designed so that the same amount of fuel vapor is supplied to each combustion chamber over the shortest possible conduit path, and it preferably consists of tubes or hoses made of a material with a low thermal conductivity, in particular plastics. This prevents recondensation of fuel in conduits 20, 22 leading to combustion chambers 10. Furthermore, the cross section of the tubes or hoses should be as small as possible so a minimal amount of fuel vapor remains in the fuel vapor conduit system without pressure building up to influence the metering function.

For starting the internal combustion engine and during the start-up and warm-up phase with the fuel delivery system described here, fuel in liquid form is metered by injection valve 25 of fuel vaporizer 19 into electrically heated vaporizer structure 27, where the liquid fuel is vaporized and expelled from the vaporization area of fuel vaporizer 19 due to the change in volume in its transition to the vapor phase. The vaporized fuel is then sent through conduit 20 and distributor conduit 22 just upstream from combustion chambers 10 into intake area 12 of intake tubes 13, whence it continues together with the intake air into combustion chambers 10.

It is thus possible to reduce hydrocarbon emissions during the start-up and warm-up phase to such an extent that extremely low exhaust levels can be achieved, such as ULEV exhaust levels (i.e., exhaust levels for "ultra low emission vehicles") because condensation of the fuel vapor on the walls of the conduits can be largely prevented.

After the warm-up phase is completed or when there is increased demand for fuel outside the FTP cycle (i.e., when accelerating sharply, when driving up a hill, etc.), the system switches to individual injection using injection valves 11 assigned to the respective combustion chambers 10. With fuel delivery using injection valves 11 assigned to combustion chambers 10, the separate tubing for the fuel vapor delivery is advantageous because it has no effect on the intake tube dynamics.

Figure 2:
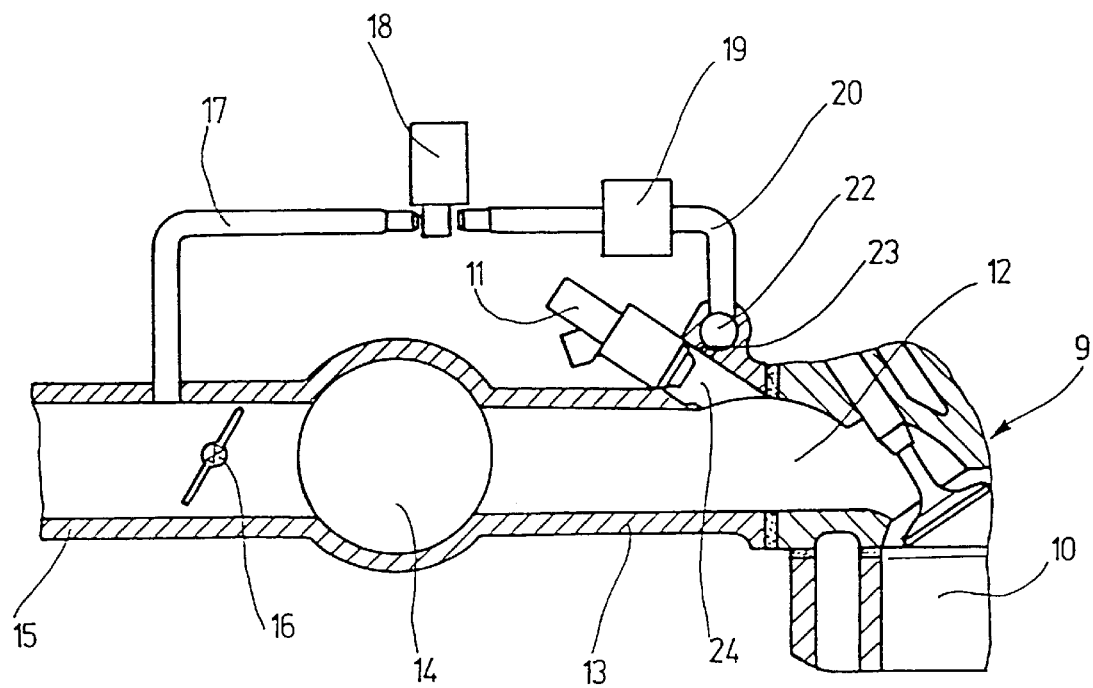
FIG. 2 shows a schematic diagram of a second embodiment of the present invention.

The fuel delivery system according to FIG. 2 has a fuel vaporizer 19 connected to auxiliary air conduit 17, where auxiliary air regulator 18 is located upstream from fuel vaporizer 19.

In FIG. 2, conduit 20, which carries fuel vapor or a fuel vapor-air mixture during the start-up and warm-up phase and carries all or part of the auxiliary air during normal operation, opens into a distributor conduit 22 arranged essentially as shown in FIG. 1. However, it is also possible to provide an auxiliary air conduit system connected to fuel vaporizer 19 so that the individual conduits lead in a manner not shown here from fuel vaporizer 19 to individual intake tubes 13 and open in the area of injection valves 11 into intake areas 12 or into the fuel discharge areas of injection valves 11.

During the warm-up phase after starting internal combustion engine 9, the fuel delivery system of FIG. 2 operates like the device according to FIG. 1 to supply the fuel vapor required to form a suitable fuel-air mixture.

The air required to form the fuel-air mixture can be supplied to fuel vaporizer 19 through throttle valve 16 and auxiliary air conduit 17 due to the pressure gradient in air intake tube 15, so the intake air entrains fuel vapor from fuel vaporizer 19. The amount of air is determined by auxiliary air regulator 18, while the amount of fuel is adjusted via injection valve 25 that serves as a fuel metering device. Injection valves 11 remain inactive during this operation.

On the other hand it is also possible to block auxiliary air conduit 17 during the warm-up phase by means of auxiliary air regulator 18 and to cause the fuel to be discharged from fuel vaporizer 19 due to the change in volume during vaporization.

After the end of the warm-up phase, fuel vaporizer 19 is switched off and the remaining fuel delivery is handled by injection valves 11. Joint use of fuel vaporizer 19 that meters the fuel and auxiliary air regulator 18 is especially advantageous here because this permits an especially accurate adjustment of the fuel-air mixture.

Figure 4:
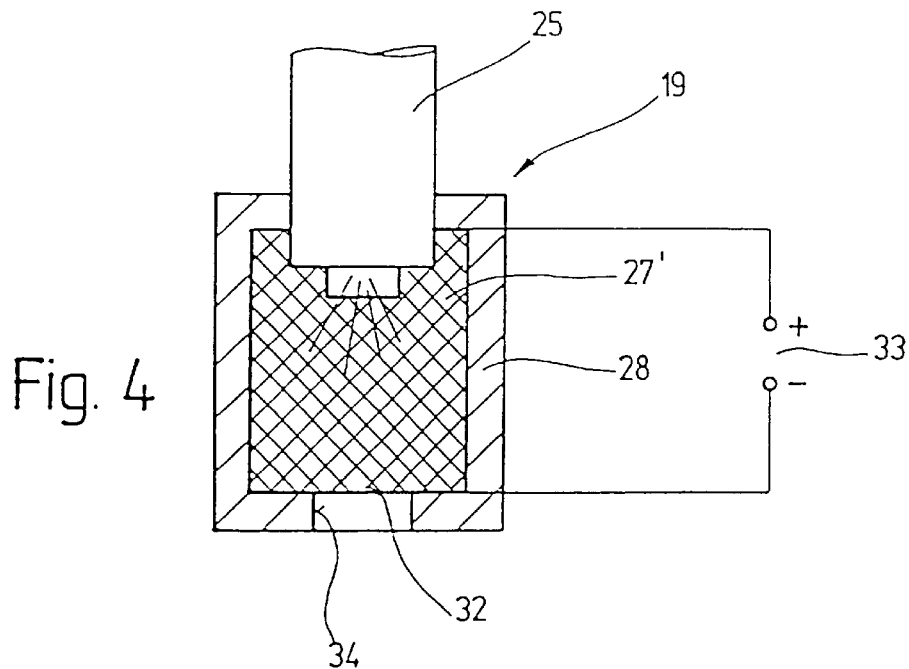
FIG. 4 shows another embodiment of a fuel vaporizer according to the present invention.

FIG. 4 shows another design of a fuel vaporizer 19, where a vaporizer structure 27' made of a material with a large surface area is arranged in housing 28 and is connected to power supply 33 for electric heating. Fuel can be injected into the vaporizer by injection valve 25. The large surface area can be achieved through narrow channels or capillaries, for example, or by using a porous material. It is also possible to use a sintered material or a material in the form of whiskers. An outlet orifice 34 provided for outlet area 32 of housing 28 is connected to conduit 20 in a manner not illustrated here. Preferably the air is guided so that it supports the discharge of fuel vapor out of vaporizer structure 27' due to the Venturi effect.

Figures 5, 6:
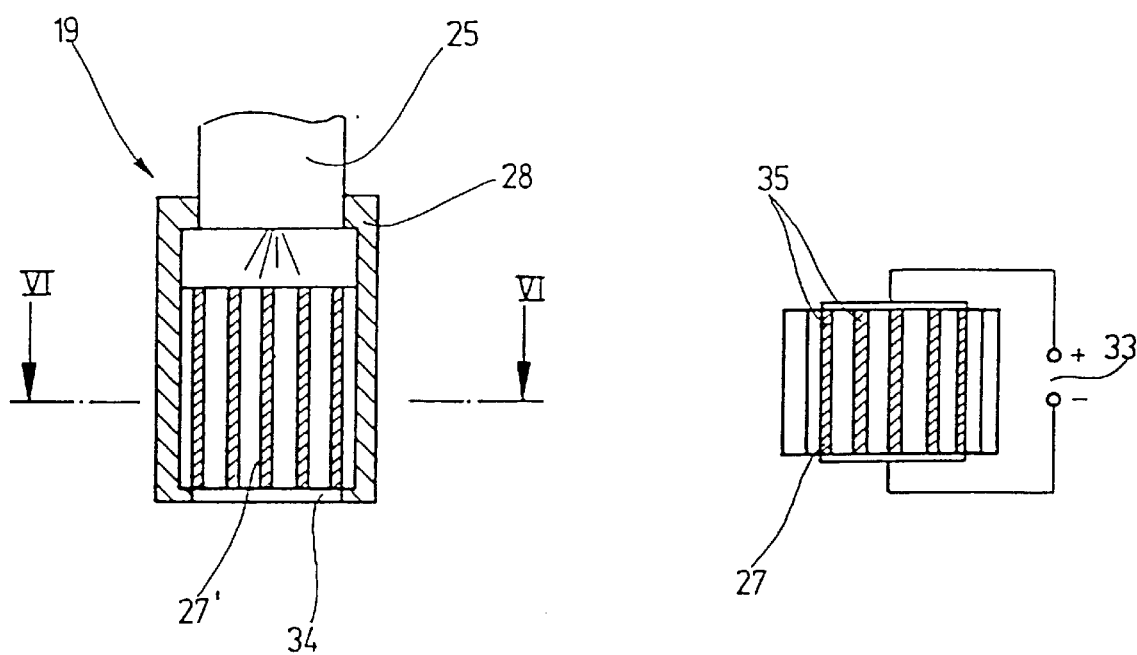
FIG. 5 shows a further embodiment of a fuel vaporizer according to the present invention.
FIG. 6 shows a section essentially through conduit VI—VI in FIG. 5.

FIGS. 5 and 6 show a plate-type vaporizer structure 27, 27' which, like that in FIG. 3, is composed of individual electrically heated plates 35 (e.g., ceramic supports coated with heating layers).

In addition, it is also possible to arrange vaporizer structure 27, 27' such that the air going to fuel vaporizer 19 flows through it. This yields optimum purging of vaporizer structure 27, 27' and greatly improves the discharge of fuel vapor.

Heating of vaporizer structure 27, which may also be accomplished with resistance materials having a positive or negative temperature coefficient, with wire coils heating layers on ceramic supports or the like, should be set up so that short heating times can be achieved and the required vaporization temperature can be properly maintained. Thermal isolation with respect to injection valve 25 (to prevent vapor bubbles from forming there) can also be achieved through the choice of materials for the vaporizer, such as plastics or ceramics, and the wall thickness dimensions of housing 28.

What is claimed is:

1. A fuel delivery system for an internal combustion engine, comprising:
   an intake air metering device;
   at least one intake tube disposed downstream of the intake air metering device, the at least one intake tube transporting intake air to a respective combustion chamber associated with each of the at least one intake tube, each combustion chamber being associated with a fuel injection valve for spray-discharging fuel to each combustion chamber through a first fuel passage;
   a central fuel vaporizer connected to the at least one intake tube through a second fuel passage that is different than the first fuel passage and generating a fuel vapor that is provided to the at least one intake tube through the second fuel passage, the central fuel vaporizer receiving fuel from a fuel metering system; and
   wherein the fuel vapor generated by the central fuel vaporizer is generated in the central fuel vaporizer independently of the fuel spray-discharged by the fuel injection valve for each combustion chamber and is added to the intake air for each combustion chamber in a respective one of the at least one intake tube downstream from the intake air metering device, and wherein the fuel vapor generated by the central fuel vaporizer is fed into the spray-discharged fuel generated by the fuel injection valve.

2. The fuel delivery system according to claim 1, wherein the central fuel vaporizer has an outlet end and wherein the second fuel passage includes a conduit system connecting the outlet end of the central fuel vaporizer to each of the at least one intake tube.

3. The fuel delivery system according to claim 2, wherein the conduit system includes:
   a distributor conduit having at least one outlet connection, each of the at least one outlet connections being associated with a separate one of the at least one intake tube and being adjacent to an intake area of the respective combustion chamber.

4. The fuel delivery system according to claim 2, wherein the central fuel vaporizer has an outlet area at the outlet end and the conduit system includes:
   at least one conduit, wherein each of the at least one conduits connects the outlet area of the central fuel vaporizer to a separate one of the at least one intake tube adjacent to an intake area of the respective combustion chamber.

5. The fuel delivery system according to claim 2, wherein the conduit system includes:
   one of tubes and hoses made of a material having a low thermal conductivity.

6. The fuel delivery system according to claim 5, wherein the material having the low thermal conductivity includes plastic.

7. The fuel delivery system according to claim 1, wherein the central fuel vaporizer includes an electrically heatable vaporizer structure.

8. The fuel delivery system according to claim 7, wherein the electrically heatable vaporizer structure includes at least one plate-type heating element having a heating surface.

9. The fuel delivery system according to claim 7, wherein the electrically heatable vaporizer structure further includes a plurality of plate-type heating elements having a plurality of heating surfaces arranged in parallel.

10. The fuel delivery system according to claim 7, wherein the electrically heatable vaporizer structure includes a porous, electrically heatable material having a plurality of channels.

11. The fuel delivery system according to claim 10, wherein the porous, electrically heatable material includes a resistance material.

12. The fuel delivery system according to claim 10, wherein the heatable material includes a resistance material having one of a positive and a negative temperature coefficient, a temperature dependence of the resistance material resulting in one of self regulation when a positive temperature coefficient exists and external regulation as a function of resistance information.

13. The fuel delivery system according to claim 1, wherein the fuel metering system includes an injection valve.

14. A fuel delivery system for an internal combustion engine, comprising:
   an intake air metering device;
   at least one intake tube disposed downstream of the intake air metering device, the at least one intake tube transporting intake air to a respective combustion chamber associated with each of the at least one intake tube, each combustion chamber being associated with a fuel injection valve;
   a central fuel vaporizer connected to the at least one intake tube and generating a fuel vapor, the central fuel vaporizer receiving fuel from a fuel metering system:
   an auxiliary air conduit system connected to the central fuel vaporizer, the auxiliary air conduit system including an auxiliary air regulator, the central fuel vaporizer being arranged downstream of the auxiliary air regulator; and
   wherein the fuel vapor generated by the central fuel vaporizer is added to the intake air for each combustion chamber in a respective one of the at least one intake tube downstream from the intake air metering device.

15. A fuel delivery system for an internal combustion engine, comprising:
   an intake air metering device;
   at least one intake tube disposed downstream of the intake air metering device, the at least one intake tube transporting intake air to a respective combustion chamber associated with each of the at least one intake tube, each combustion chamber being associated with a fuel injection valve;
   a central fuel vaporizer connected to the at least one intake tube and generating a fuel vapor, the central fuel vaporizer receiving fuel from a fuel metering system;
   an auxiliary air conduit system connected to the central fuel vaporizer, the auxiliary air conduit system carrying a substream of auxiliary air;
   and
   wherein the fuel vapor generated by the central fuel vaporizer is added to the intake air for each combustion chamber in a respective one of the at least one intake tube downstream from the intake air metering device.

16. The fuel delivery system according to claim 15, wherein the central fuel vaporizer is connected to the auxiliary air conduit system so that a vaporization area of the central fuel vaporizer is purged by air supplied into the vaporization area.

17. The fuel delivery system according to claim 16, wherein the vaporization area is purged utilizing the Venturi principle.

* * * * *

UNITED STATES PATENT AND TRADEMARK OFFICE
CERTIFICATE OF CORRECTION

PATENT NO. : 5,873,354
DATED : February 23, 1999
INVENTOR(S) : Klaus-Henning Krohn, et al It is certified that error appears in the above-identified patent and that said Letters Patent is hereby corrected as shown below:

Column 1, line 11, after "A)", delete "of";

Column 1, line 14, "the internal combustion", should be changed to –an internal combustion–;

Column 1, line 14, "engine. Near the", should be changed to –engine. Injection valves are located here–;

Column 1, line 63, "wall", should be changed to –walls–;

Column 2, line 52, "diagram of a", should be changed to –diagram according to a–;

Signed and Sealed this

Twenty-first Day of March, 2000

Attest:

Q. TODD DICKINSON

*Attesting Officer*   *Commissioner of Patents and Trademarks*